United States Patent [19]

Schaeper et al.

[11] 4,438,900
[45] Mar. 27, 1984

[54] LOCKING MECHANISM FOR ANNULAR BLOWOUT PREVENTER

[75] Inventors: Gary R. Schaeper; Richard A. Olson, both of Houston, Tex.

[73] Assignee: NL Industries, Inc., New York, N.Y.

[21] Appl. No.: 156,722

[22] Filed: Jun. 5, 1980

[51] Int. Cl.³ .................. E21B 33/06; F16L 21/08
[52] U.S. Cl. ..................... 251/1 B; 285/90; 285/309; 285/323; 285/421
[58] Field of Search .............. 285/321, 90, 323, 421, 285/404, 322, DIG. 21, 309, 314, 139, 141; 251/1 R, 1 A, 1 B; 277/31, 73; 166/84

[56] References Cited

U.S. PATENT DOCUMENTS

| | | |
|---|---|---|
| 3,023,012 | 2/1962 | Wilde . |
| 3,321,217 | 5/1967 | Ahlstone ..................... 285/421 X |
| 3,387,865 | 6/1968 | Ross .............................. 285/322 |
| 3,561,723 | 2/1971 | Cugini . |
| 3,741,295 | 6/1973 | Murman et al. . |
| 3,741,296 | 6/1973 | Murman et al. . |
| 3,821,984 | 6/1974 | Lee . |
| 3,827,728 | 8/1974 | Hynes ............................. 285/90 |
| 4,049,297 | 9/1977 | Reneau ......................... 285/322 |
| 4,068,865 | 1/1978 | Shunks .......................... 285/90 |
| 4,098,341 | 7/1978 | Lewis . |
| 4,124,233 | 11/1978 | Ahlstone ..................... 285/321 |
| 4,283,039 | 8/1981 | Schueper et al. ............ 251/1 B |

Primary Examiner—Dave W. Arola
Attorney, Agent, or Firm—Browning, Bushman, Zamecki & Anderson

[57] ABSTRACT

A locking mechanism for securing the upper housing of an annular blowout preventer to the lower housing. A split latch ring having a plurality of angled teeth cut in its outer diameter is expandable into the lower housing which is provided with a plurality of locking grooves contoured to mate with the teeth. A locking ring with a tapered outer surface mates with a tapered inner surface on the latch ring for expanding the latch ring. Bolting the inner locking ring to the upper housing causes downward movement of the locking ring forcing the latch ring outwardly and down the taper of the engaging teeth. The upper housing is locked to the lower housing as the upper housing has a shoulder engaging the lower edge of the downwardly moving latch ring causing seating of the upper housing on to the lower housing and compensating for variations in machining tolerances.

12 Claims, 5 Drawing Figures

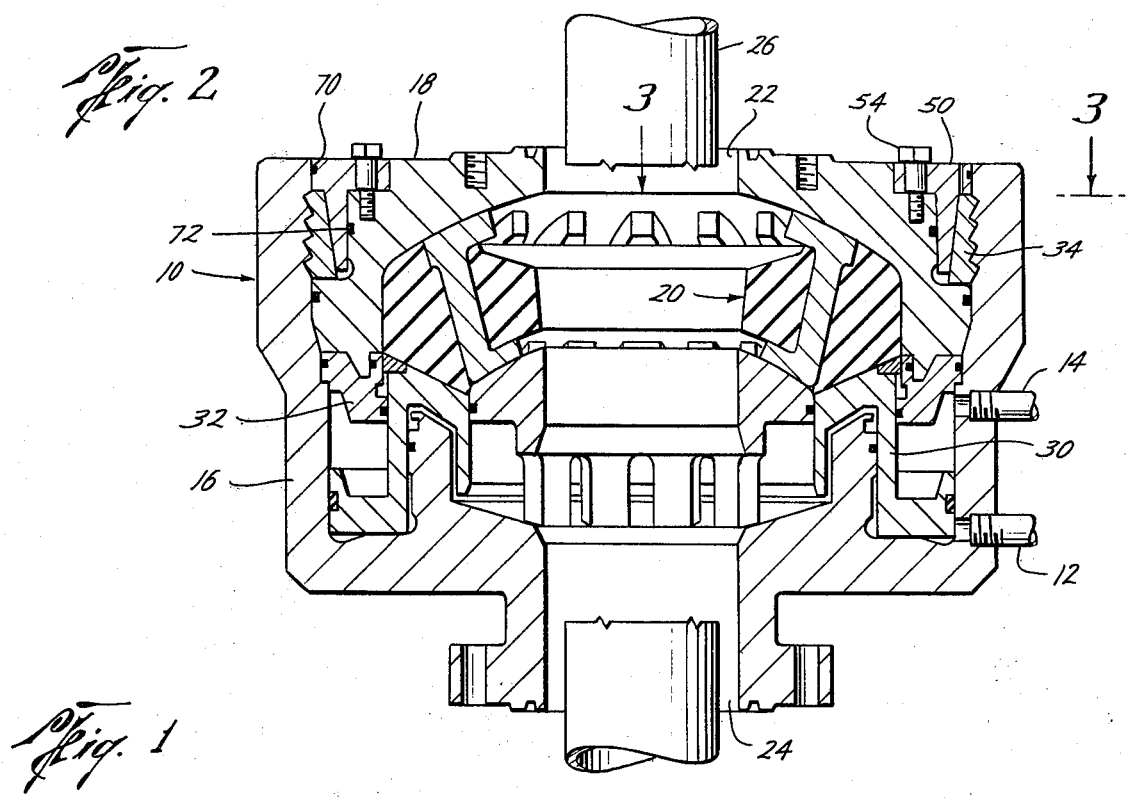
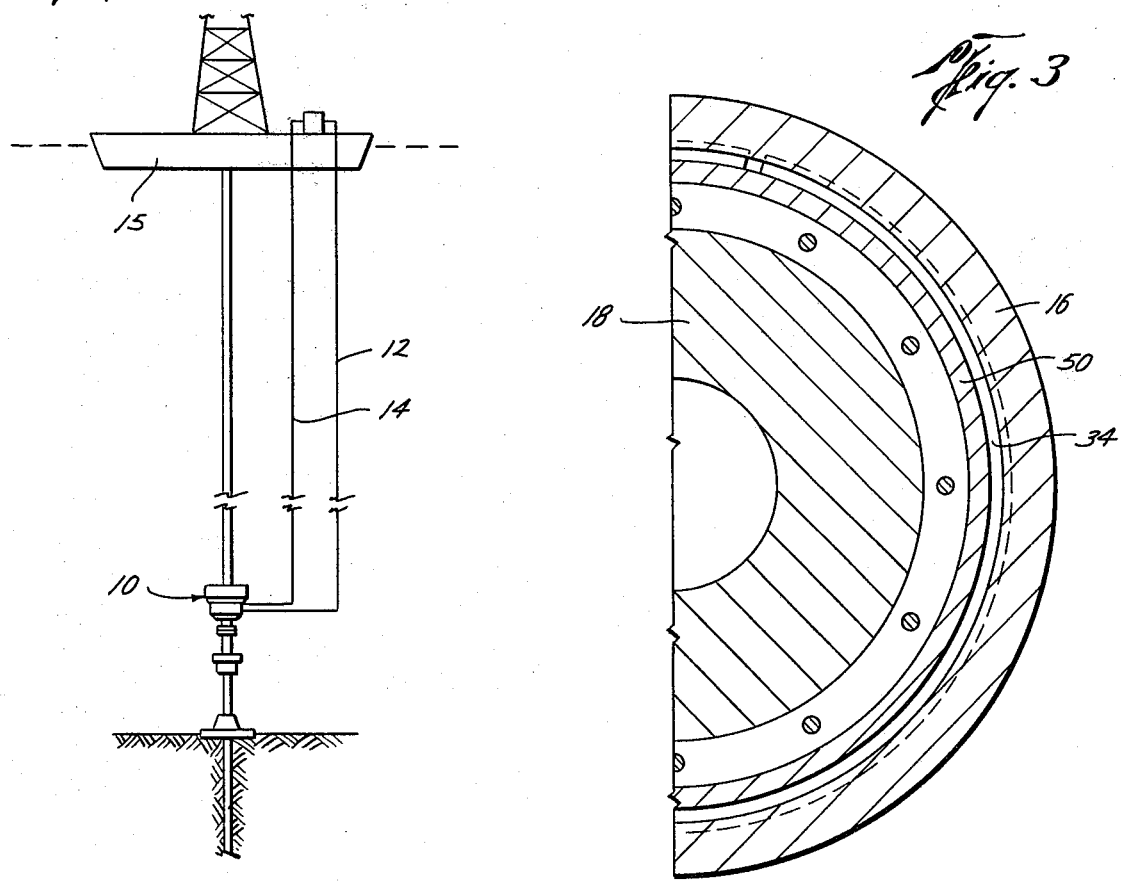

LOCKING MECHANISM FOR ANNULAR BLOWOUT PREVENTER

BACKGROUND OF THE INVENTION

Most annular blowout preventers offer some type of locking mechanism to facilitate quick changing of the blowout preventer sealing element. Existing designs include locking dogs or segments which are moved inwardly or outwardly by a tapered locking ring in a horizontal direction. These designs have the disadvantages of having a large number of individual segments which must be handled for assembling or removing the upper housing, some mechanisms are also open to admit debris which might interfere with the operation of the locking mechanism, and such designs do not provide for an adjustment in the position of the upper and lower housings relative to each other for compensating for variations in machining tolerances.

The present invention is directed to an improved locking mechanism for securing the upper housing of an annular blowout preventer to the lower housing for allowing for ease of replacement of the sealing element and overcoming the disadvantages of the prior art designs.

SUMMARY

The present invention is directed to an improvement in a locking mechanism for an annular blowout preventer adapted for use on an oil or gas rig in which the blowout preventer includes a lower housing, an upper housing, a resilient sealing means therein and a piston for actuating the sealing means in which the improved locking means secures the upper housing to the lower housing.

The locking means includes a split circular latch ring having a plurality of teeth on its outer circumference in which the teeth are angled outwardly and downwardly and the latch ring has a tapered surface on its inner circumference tapered downwardly and inwardly. The lower housing includes a plurality of locking grooves contoured to mate with the teeth. The upper housing includes a seating surface for engaging the lower housing and includes a shoulder for engaging the lower edge of the latch ring. A locking ring, having a tapered outside surface to match the tapered inside surface of the latch ring, telescopically engages the upper housing and is secured to the upper housing by adjustable securing means. Downward movement of the locking ring relative to the upper housing will force the latch ring outwardly and force the teeth outwardly and down the mating contours of the locking grooves for moving the upper housing downwardly and locked to the lower housing.

Another object of the present invention is the provision of sealing means between the locking ring and the lower housing and sealing means between the locking ring and the upper housing thereby preventing debris from interfacing with the locking means.

Still a further object of the present invention is providing the teeth with tapered downwardly and outwardly surfaces at approximately 20° from the horizontal for wedging the upper housing to the lower housing and compensating for variations in machining tolerances.

Other and further objects, features and advantages will be apparent from the following description of a presently preferred embodiment of the invention, given for the purpose of disclosure, and taken in conjunction with the accompanying drawings where like character references designate like parts throughout the several views.

BRIEF DESCRIPTION OF THE DRAWINGS

FIG. 1 is a diagrammatic view of a subsea drilling rig in which a blowout preventer of the present invention may be used, FIG. 2 is an elevational view, in cross section, of the preferred embodiment of the present invention in which the blowout preventer is in the open position, FIG. 3 is a fragmentary elevational view, taken along the line 3—3 of FIG. 2.

DESCRIPTION OF THE PREFERRED EMBODIMENT

Figure 4:
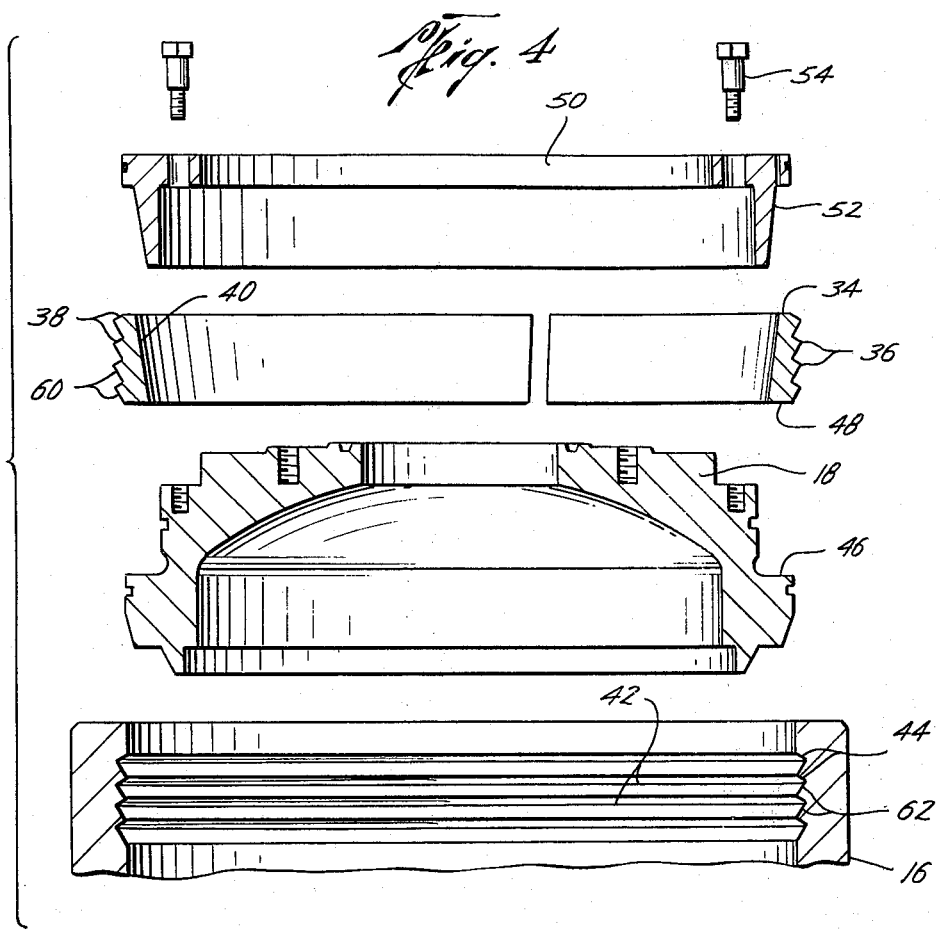
FIG. 4 is an exploded elevational view of the locking mechanism of the present invention.

While the latching mechanism of the present invention may be utilized with various types of annular blowout preventers, for purposes of illustration only, the latching mechanism of the present invention will be described in its use in an annular blowout preventer manufactured by N L Shaffer, described in co-pending application Ser. No. 156,833, also filed June 5, 1980, and now U.S. Pat. No. 4,283,039.

Referring now to FIG. 1, a blowout preventer generally indicated by the reference numeral 10, for example only, may be used in offshore subsea drilling operations and actuated through control lines 12 and 14 from a drilling barge 15 although the blowout preventer 10 may be used in all types of drilling rigs whether underwater or not.

Referring now to FIG. 2, the blowout preventer 10 generally includes a lower housing 16, an upper housing 18 and a resilient sealing element therein, generally indicated by the reference numeral 20. Axially aligned well tool receiving ports 22 and 24 are provided in the upper housing 18 and lower housing 16, respectively, for receiving a well tool or drilling string 26, which is adapted to be axially moved within the apparatus 10.

Figure 5:
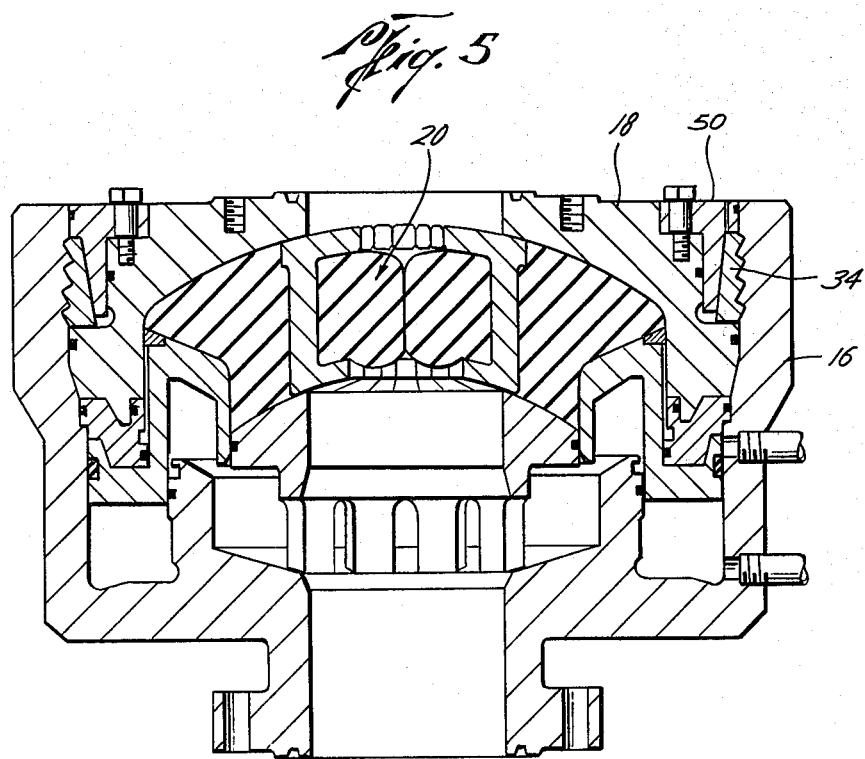
FIG. 5 is an elevational view in cross section of the blowout preventer of FIG. 2 shown in the closed position.

The sealing means 20 moves between a non-sealing position, as best seen in FIG. 2, between the upper housing 18 and the lower housing 16 to a sealing position, as best seen in FIG. 5, by suitable actuating means such as double acting piston 30 which is moved in response to fluid supplied from the control lines 12 and 14.

The upper housing 18 coacts with and seats on the lower housing 16 such as on an adapter ring 32 for securely holding the components in place. The latch mechanism for securing the upper housing 18 to the lower housing 16 must be extremely sturdy to withstand the forces involved, but yet must be easily operated for allowing the quick removal of the upper housing 18 for easy replacement of the sealing element 20 after it has been subjected to wear.

Referring now to FIGS. 2-5, the locking mechanism of the present invention includes an outer split latch ring 34 having a plurality of angled teeth 36 on its outer circumference. The teeth 36 are angled outwardly and downwardly to form wedge surfaces 38 which are preferably at an angle of approximately 20° from the horizontal. The latch ring 34 also includes a tapered surface 40 on its inner surface which tapers downwardly and inwardly. The lower housing 16 includes a plurality of locking grooves contoured to mate with the angled teeth 36 and in particular include wedge surfaces 44 which coact with teeth surfaces 38 for forcing the latching ring 34 downwardly and in turn forcing the upper housing 18 downwardly since the upper housing includes a shoulder 46 which engages the lower edge 48 of the latch ring 34.

A locking ring 50 is provided having a tapered surface 52 on its outer circumference which is contoured to match with the tapered surface 40 on the inner surface of the latch ring 34. The locking ring 50 telescopically engages the upper housing 18 and is adjustably secured thereto by adjustable securing means such as bolts 54 for adjustably securing the locking ring 50 to the upper housing 18. Downward movement of the locking ring 50 relative to the upper housing 18 will force the latch ring 34 outwardly and force the teeth 36 down the mating contours 42 of the locking groove for moving the upper housing 18 downwardly and locked to the lower housing 16.

Referring specifically to FIG. 4, it is noted that the teeth 36 of the latch ring 34 have surfaces 60 movable into the grooves 42 of the lower housing 16 against contoured surfaces 62 which are shaped to mate with the surfaces 60. However, the dimensions of the apparatus are such that the surfaces 60 and 62 are not intended to mate or touch. That is, if the surfaces 60 and 62 mate, the downward movement of the latching ring 34 would be stopped. However, if the dimensions are such that the surfaces 60 and 62 do not mate then the latch ring 34 may be wedged downwardly by the coaction of the angled wedge surfaces 38 acting against the surfaces 44 of the upper housing 16 providing an advantageous adjustment in the locking mechanism to compensate for variations in machining tolerances in the apparatus 10 to insure that the upper housing 18 securely seats on the lower housing 16.

Sealing means 70 are provided between the locking ring 50 and the lower housing 16 and sealing means 72 are provided between the locking ring 50 and the upper housing 18 for preventing the admittance of debris into the locking mechanism.

In use, the upper housing 18 is set into the lower housing 16 on top of the adapter ring 32 and the outer split latch ring 34 is set in place between the upper housing 18 and the lower housing 16 adjacent the mating grooves 42. The locking ring 50 is telescoped downwardly between the upper housing 18 and the latch ring 34 and the coacting tapered surfaces 52 on the locking ring 50 and 40 on the latch ring 34 are engaged. Tightening of the bolts 54 continues downward movement of the inner locking ring 50 which will force the outer latch ring 34 further outwardly and down the coacting taper 38 of the teeth 36 on the surfaces 44 of the locking groove 42. Downward wedging movement of the latch ring 34 will force the upper housing 18 downwardly securing it in a seating relationship with the lower housing 16 regardless of minor variations in machining tolerances of the various parts.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. In an annular blowout preventer adapted for use on an oil or gas well rig, and having a lower housing, an upper housing, a resilient sealing means therein, and a piston for actuating said sealing means, the improvement in locking means for securing the upper housing to the lower housing, comprising:

a split circular latch ring having a plurality of teeth on its outer surface, said teeth angled outwardly and downwardly, said ring having a tapered surface on its inner surface tapered downwardly and inwardly, said lower housing having a plurality of locking grooves contoured to mate with said teeth, said upper housing having a seating surface for engaging said lower housing, and having a shoulder for engaging the lower edge of said latch ring, a locking ring having a tapered surface on its outer surface contoured to mate with the tapered inner surface on said latch ring, and telescopically engaging said upper housing, and securing means for securing said locking ring to said upper housing whereby tightening said securing means produces downward movement of said locking ring relative to said upper housing, said downward movement forcing said latch ring outward and forcing said teeth outward and down the mating contours of said locking grooves, said teeth and said locking grooves including surfaces which are spaced from each other insuring the downwardly movement of said latch ring and said upper housing to seatingly engage said seating surface of said upper housing with said lower housing and to lock together said housings.

2. The apparatus of claim 1 wherein the securing means is a threaded connection for adjusting the seating force between the upper housing and the lower housing through the tapered surfaces between the locking ring and the latch ring and through the teeth and locking grooves.

3. The apparatus of claim 1 including sealing means between the locking ring and the lower housing and sealing means between the locking ring and the upper housing preventing debris interfering with the locking means.

4. The apparatus of claim 1 wherein the teeth are tapered downwardly and outwardly at approximately twenty degrees from horizontal.

5. In an annular blowout preventer adapted for use on an oil or gas well rig, and having a first housing, a second housing, a resilient sealing means therein, and a means for actuating said sealing means, the improvement in locking means for securing the first to the second housing, comprising:

a split circular latch ring having a plurality of engaging surfaces on its outer surface and having its inner surface tapered inwardly toward a first side;

said first housing having a plurality of complementary engaging surfaces contoured to mate with the engaging surfaces of said latch ring;

said second housing having a seating surface for engaging a complementary seating surface on said first housing, and having a shoulder for engaging said first side of said latch ring;

a locking ring having a complementary tapered outer surface contoured to mate with the tapered inner surface of said latch ring, and telescopically engaging said second housing; and securing means for securing said locking ring to said second housing whereby tightening said securing means moves said locking ring and said second housing toward one another and expands said split latch ring forcing said engaging surfaces of said latch ring and said first housing into engagement, said engaging surfaces on said latch ring and said first housing contoured and including surfaces spaced from each other to insure movement of said latch ring and said second housing toward said first housing to seatingly engage said seating surfaces and to lock together said housings.

6. The apparatus of claim 5 wherein said engaging surfaces on said latch ring and said first housing are teeth and complementary grooves.

7. The apparatus of claim 6 wherein said engaging surfaces on said latch ring are teeth.

8. The apparatus of claim 7 wherein said teeth are angled outwardly and toward said first side of said latch ring.

9. In an annular blowout preventer adapted for use on an oil or gas well rig, and having a first housing, a second housing, a resilient sealing means therein, and a means for actuating said sealing means, the improvement in locking means for securing the first to the second housing, comprising:

a split circular latch ring having a plurality of engaging surfaces on one surface and having its inner surface tapered;

said first housing having a plurality of complementary engaging surfaces contoured to mate with the engaging surfaces of said latch ring;

said second housing having a seating surface for engaging a complementary seating surface on said first housing, and having a shoulder for engaging said latch ring;

a locking ring having a complementary tapered surface contoured to mate with the tapered inner surface of said latch ring, and telescopically engaging said second housing;

adjusting and securing means whereby tightening said adjusting and securing means moves said locking ring and said second housing toward one another and through said tapered surfaces moves said split latch ring forcing said engaging surfaces of said latch ring and said first housing into engagement, said engaging surfaces on said latch ring and said first housing contoured and including surfaces spaced from each other to insure movement of said latch ring and said second housing toward said first housing to seatingly engage said seating surfaces for securing said housings in a locked position.

10. The apparatus of claim 9 wherein said adjusting and securing means are combined in a single element.

11. The apparatus of claim 10 wherein said adjusting and securing means is a threaded connection for adjusting the seating force between said first and second housings applied through said tapered surfaces of said locking ring and said latch ring and through said engaging surfaces.

12. The apparatus of claim 11 wherein said engaging surfaces on said latch ring and said first housing are teeth and complementary grooves.

* * * * *